(12) United States Patent
Kawagoe

(10) Patent No.: US 8,493,042 B2
(45) Date of Patent: Jul. 23, 2013

(54) SWITCHING REGULATOR

(75) Inventor: Osamu Kawagoe, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 98 days.

(21) Appl. No.: 13/277,721

(22) Filed: Oct. 20, 2011

(65) Prior Publication Data

US 2012/0105029 A1    May 3, 2012

(30) Foreign Application Priority Data

Oct. 27, 2010  (JP) .................................. 2010-240333

(51) Int. Cl.
G05F 1/00 (2006.01)
(52) U.S. Cl.
USPC .......................................... 323/271; 323/285
(58) Field of Classification Search
USPC .......................................... 323/271, 282–285
See application file for complete search history.

(56) References Cited

U.S. PATENT DOCUMENTS

| | | | | |
|---|---|---|---|---|
| 7,221,129 B2* | 5/2007 | Matsuo et al. | ................. | 323/284 |
| 7,408,333 B2* | 8/2008 | Chen et al. | ..................... | 323/282 |
| 7,605,576 B2* | 10/2009 | Kanakubo | ..................... | 323/285 |
| 8,274,270 B2* | 9/2012 | Hsieh et al. | .................... | 323/283 |
| 8,310,219 B2* | 11/2012 | Kuroyabu et al. | ............ | 323/285 |
| 2011/0062926 A1* | 3/2011 | Qiu et al. | ....................... | 323/282 |

FOREIGN PATENT DOCUMENTS

JP    2009-278713    11/2009

* cited by examiner

*Primary Examiner* — Jue Zhang
(74) *Attorney, Agent, or Firm* — IPUSA, PLLC

(57) ABSTRACT

A switching regulator includes: switching transistors configured to perform switching according to a control signal; an inductor connected to the switching transistors; a control mode switch unit configured to switch between a first control mode and a second control mode based on a direction in which a current flows through the inductor; an amplifier configured to operate as an error amplifier or a comparator; and a phase compensation unit connected to the amplifier by a switch unit, wherein, in the first control mode, the control mode switch unit connects the amplifier and the phase compensation unit by turning on the switch unit so as to cause the amplifier to operate as the error amplifier, and in the second control mode, the control mode switch unit turns off the switch unit so as to cause the amplifier to operate as the comparator.

2 Claims, 3 Drawing Sheets

SWITCHING REGULATOR

CROSS-REFERENCE TO RELATED APPLICATION

The present application is based upon and claims the benefit of priority of Japanese Patent Application No. 2010-240333, filed on Oct. 27, 2010, the entire contents of which are incorporated herein by reference.

BACKGROUND OF THE INVENTION

1. Field of the Invention

The present invention relates to a switching regulator that converts an input voltage inputted to an input terminal into a predetermined constant voltage and that outputs the constant voltage to a load from an output terminal.

2. Description of the Related Art

In recent years, a non-insulated type switching regulator that includes an inductor is used as a highly-efficient power source circuit used for a small electronic apparatus.

As a control method of the switching regulator, two schemes are known. One scheme is PWM (Pulse Width Modulation) control in which output voltage is controlled to be constant by changing a duty cycle of a clock pulse of a constant cycle. Another one is PFM (Pulse Frequency Modulation) control in which output voltage is controlled to be constant by changing a cycle of a clock while keeping pulse width constant.

In the PWM control, since On/Off control is performed on a switching transistor at constant period even for a light load, efficiency for a light load for which output current is small becomes deteriorated. On the other hand, according to PFM control, since the frequency of the signal for controlling the switching transistor changes according to a connected load, PFM control is more efficient than PWM control for light loads.

Therefore, there is a switching regulator that switches between PWM control and PFM control. A switching regulator that performs control by switching between PWM control and PFM control is described in Japanese Laid-Open Patent Application No. 2009-278713, for example.

Such a switching regulator includes an amplifier for PWM control and an amplifier for PFM control so as to realize PWM control and PFM control by switching between the amplifiers.

In the configuration of the switching regulator, there are problems in that there is variation of output voltages between control modes and that the circuit size becomes large.

SUMMARY OF THE INVENTION

Accordingly, the present invention is conceived in view of the above-mentioned problems, and an object of the present invention is to provide a switching regulator that can suppress variation of output voltages with a simple configuration.

According to an embodiment of the present invention, there is provided a switching regulator that converts an input voltage into a constant voltage and outputs the constant voltage to a load. The switching regulator includes:

switching transistors configured to perform switching according to a control signal;

an inductor connected to the switching transistors;

a control mode switch unit configured to switch between a first control mode and a second control mode based on a direction in which a current flows through the inductor;

an amplifier configured to operate as an error amplifier or a comparator; and a phase compensation unit connected to the amplifier by a switch unit, wherein, in the first control mode, the control mode switch unit connects the amplifier and the phase compensation unit by turning on the switch unit so as to cause the amplifier to operate as the error amplifier, and in the second control mode, the control mode switch unit turns off the switch unit so as to cause the amplifier to operate as the comparator.

In the switching regulator, the first control mode may be a PWM control mode and the second control mode may be a PFM control mode.

According to an embodiment of the present invention, variation of output voltages can be suppressed with a simple configuration.

Other objects and further features of the present invention will be apparent from the following detailed description when read in conjunction with the accompanying drawings.

DESCRIPTION OF THE PREFERRED EMBODIMENTS

Prior to describing an embodiment of the present invention, problems will be described in more detail with reference to figures for convenience of understanding.

Figure 1:
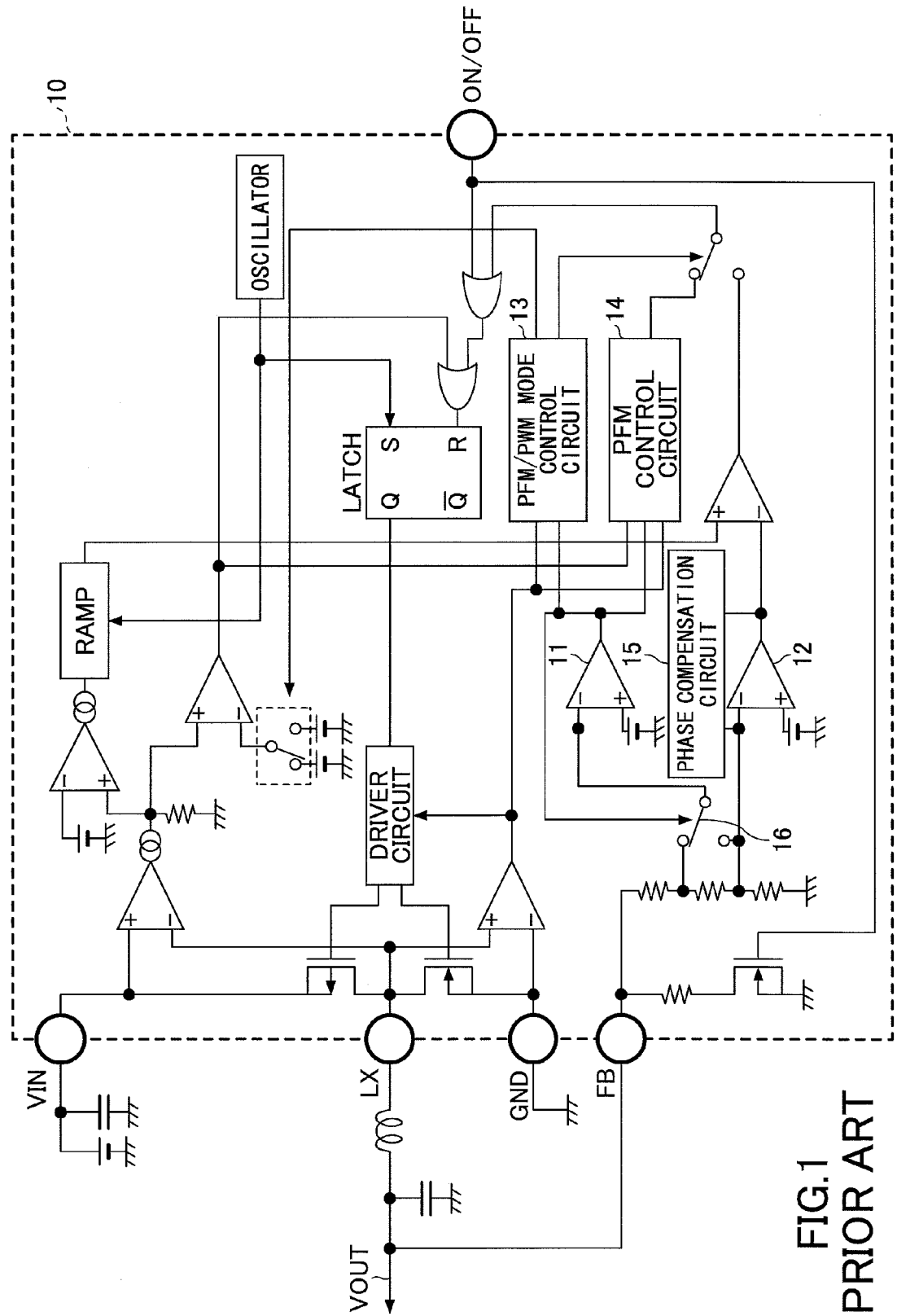
FIG. 1 is a diagram showing an example of a switching regulator that switches between PWM control and PFM control.

FIG. 1 is a diagram showing an example of a switching regulator 10 having a function for switching between PWM control and PFM control. The switching regulator 10 converts an input voltage supplied from an input terminal VIN into a predetermined constant voltage, and outputs the converted voltage from an output terminal VOUT as an output voltage. The switching regulator 10 includes a PWM control amplifier 11, a PFW control amplifier 12, a PWM/PFM mode control circuit 13, a PFM control circuit 14, a phase compensation circuit 15, and a switch 16.

In the switching regulator 10, the PWM/PFM mode control circuit 13 switches between the PWM control amplifier 11 and the PFM control amplifier 12 by flipping the switch 16 so as to switch between the PWM control mode and the PFM control mode.

According to the switching regulator 10, the output voltage is controlled by an error amplifier in the PWM control mode, and the output voltage is controlled by a comparator in the PFM control mode. Therefore, there is a problem in that variation of output voltages occurs between the control modes due to difference of offset voltages between the error amplifier and the comparator. Also, since the phase compensation circuit 15 is required for the error amplifier to avoid oscillation, the response speed decreases and the error amplifier cannot be shared as the comparator. Thus, the circuit size becomes large. A switching regulator described below as an embodiment solves the above-mentioned problem.

In the following, an embodiment of the present invention is described with reference to figures.

In a switching regulator of an embodiment of the present invention, two control modes share an amplifier. The two control modes of the present embodiment are the PWM control mode and the PFM control mode, respectively. In the PWM control mode, the amplifier is caused to operate as an error amplifier by connecting a phase compensation circuit to the amplifier. In the PFM control mode, the amplifier is caused to operate as an comparator.

Figure 2:
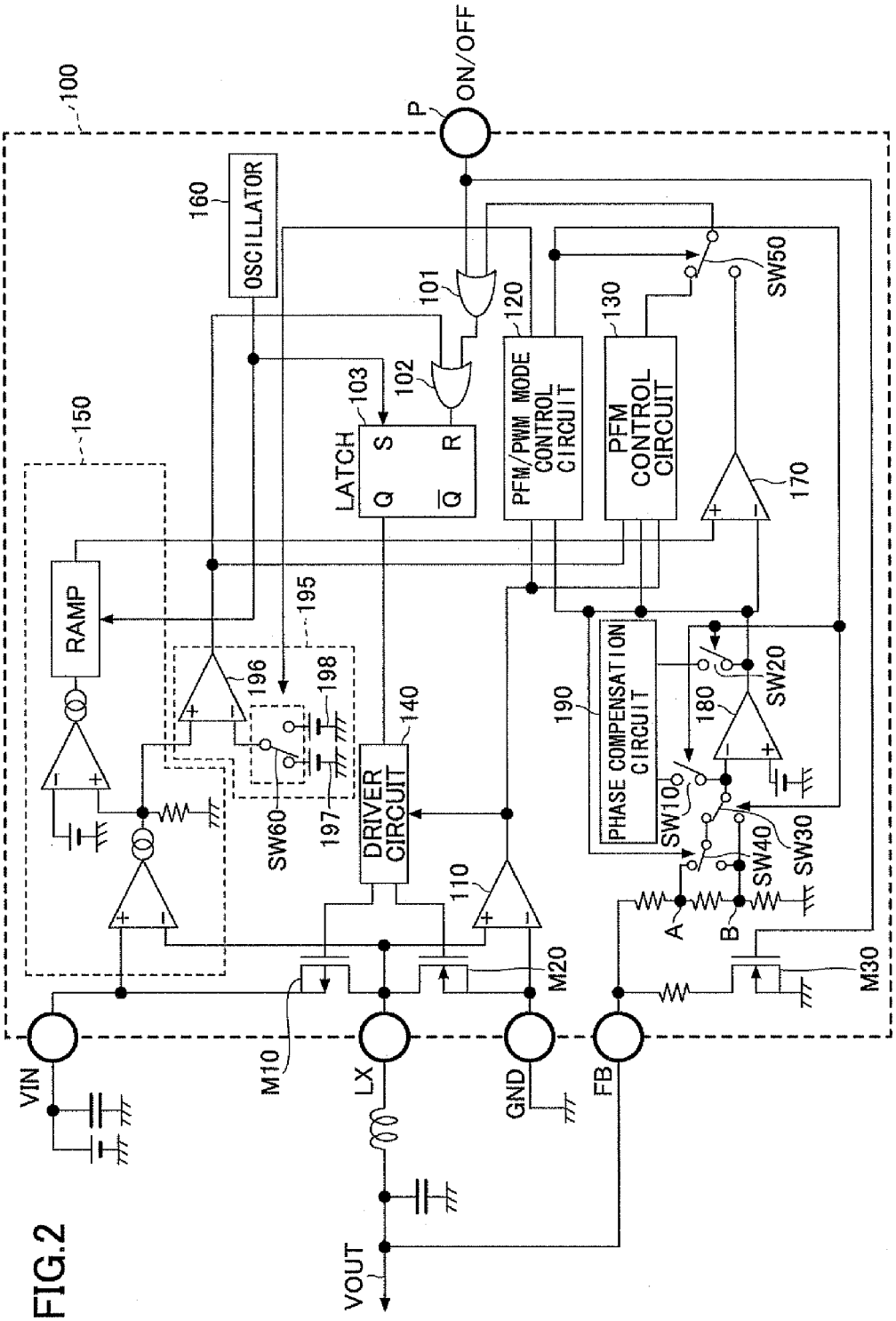
FIG. 2 is a diagram showing a switching regulator according to an embodiment of the present invention.

FIG. 2 is a diagram for explaining the switching regulator 100 of an embodiment of the present invention.

The switching regulator 100 of the present embodiment includes an inductor. LX that converts an input voltage supplied to an input terminal VIN into a predetermined voltage, and that outputs the converted voltage to a load as an output voltage. The load is connected to an output terminal VOUT, and the output voltage is output from the output terminal VOUT. The switching regulator of the present embodiment includes switching transistors M10, M20 and M30, a comparator 110, a PWM/PFM mode control circuit 120, a PFM control circuit 130, a driver circuit 140, a sawtooth generation circuit 150, an oscillator 160, a PWM comparator 170, an amplifier 180, a phase compensation circuit 190, a current restriction circuit 195, and switches SW10, 20, 30, 40, 50 and 60.

The switching transistors M10 and M20 are transistors for performing switching operation in order to perform output control of an input voltage. The switching transistor M10 is a PMOS transistor and the switching transistor M20 is an NMOS transistor. The inductor LX is charged by the input voltage according to switching of the switching transistor M10 or the switching transistor M20.

The comparator 110 detects a reverse flow of a current that flows through the inductor LX based on a potential at the connection point of the inductor LX and the switching transistors M10 and M20. The reverse flow of the current occurs when a load connected to the output terminal VOUT becomes smaller than a predetermined value.

The PWM/PFM mode control circuit 120 performs control for switching between the PWM control mode and the PFM control mode based on an output of the comparator 110. More particularly, the PWM/PFM mode control circuit 120 performs switching the switches SW10-SW60. Also, the PWM/PFM mode control circuit 120 outputs a mode switch signal to the PFM control circuit 130.

When the PFM control circuit 130 receives the mode switch signal from the PWM/PFM mode control circuit 120, the PFM control circuit 130 outputs a control signal for controlling switching of the switching transistors M10 and M20 to the driver circuit 140 so as to perform PFM control.

The sawtooth generation circuit 150 generates a sawtooth wave of a predetermined frequency by using a signal supplied from the oscillator 160. The sawtooth wave is supplied to a non-inverting input terminal of the PWM comparator 170. The output of the amplifier 180 is supplied to an inverting input terminal of the PWM comparator 170. The output of the PWM comparator 170 is connected to one end of the switch SW 50.

The output of the amplifier 180 is also supplied to the PFM control circuit 130. In addition, a reference voltage is supplied to a non-inverting input terminal of the amplifier 180. An inverting input terminal of the amplifier 180 is connected to a connection point A or B via the switches SW30 and SW40. The voltage of the connection point A is a first voltage obtained by dividing the output voltage, and the voltage of the connection point B is a second voltage obtained by dividing the output voltage.

The switching transistor M30 is a switch element for controlling on/off of the whole switching regulator 100. ON/OFF is controlled by a signal from the terminal P. In the present embodiment, for example, when a signal for turning off the switching transistor M30 is supplied to the terminal P, the switching transistor M30 is turned off so that the whole switching regulator 100 is turned off.

The current restriction circuit 195 restricts a current flowing into the load. The current restriction circuit 195 has two reference voltages, so that a reference voltage to be used is switched between the two reference voltages according to the mode (PWM control mode or PFM control mode).

Each of the switch SW10 and the switch SW20 is connected to the phase compensation circuit 190 at one end. Another end of the switch SW10 is connected to the inverting input terminal of the amplifier 180. Another end of the switch SW20 is connected to the output of the amplifier 180.

Also, one end of the switch SW 30 of the present embodiment is connected to the non-inverting input terminal of the amplifier 180, and another end is connected to one end of the switch SW40 or to the connection point B. Another end of the switch SW40 is connected to the connection point A or to the connection point B. One end of the switch SW50 switch SW 50 is connected to an input of the OR circuit 101, and another end of the switch SW50 is connected to the output of the PFM control circuit 130 or to the output of the PWM comparator 170.

Another input of the OR circuit 101 is connected to the terminal P. The output of the OR circuit 101 is connected to one input of the OR circuit 102, and another input of the OR circuit 102 is connected to the output of the comparator 196 included in the current restriction circuit 195. The output of the OR circuit 102 is supplied to a reset terminal of the flip-flop 103. The output of the flip-flop 103 is connected to the driver circuit 140. Also, a clock signal is supplied to a set terminal of the flip-flop 103 from the oscillator 160. One end of the switch SW60 is connected to an inverting input terminal of the comparator 196. Another end of the switch SW60 is connected to the reference voltage 197 or to the reference voltage 198.

In the present embodiment, when it is detected by the comparator 110 that the direction of the current that flows through the inductor LX changes, the PWM/PFM mode control circuit 120 outputs the switch signal to the switches SW10-SW60.

In the following, connections of switches in the PWM control mode are described. In the PWM control mode, each of the switches SW10 and SW20 is turned on, so that the phase compensation circuit 190 is connected to the amplifier 180. The other end of the switch SW30 is connected to the connection point B. The other end of the switch SW40 is connected to the connection point A. The other end of the switch SW50 is connected to the output of the PWM comparator 170. The other end of the switch SW60 is connected to the reference voltage 197.

Next, connections of switches in the PFM control mode are described. In the PFM control mode, each of the switches SW10 and SW20 is turned off. The other end of the switch SW30 is connected to the one end of the switch SW40, and the other end of the switch SW40 is connected to the connection point A. The other end of the switch SW50 is connected to the output of the PFM control circuit 130. The other end of the switch SW60 is connected to the reference voltage 198.

That is, according to the present embodiment, in the PWM control mode, the amplifier 180 is caused to function as an error amplifier by connecting the phase compensation circuit 190 to the amplifier 180. In the PFM control mode, the amplifier 180 is disconnected from the phase compensation circuit 190, so that the amplifier 180 is caused to function as a comparator. According to the present embodiment, one amplifier can be shared as the error amplifier and the comparator.

Therefore, according to the present embodiment, there is no difference between offset voltages of the error amplifier and the comparator, so that variation of output voltages between control modes can be eliminated.

Figure 3A:
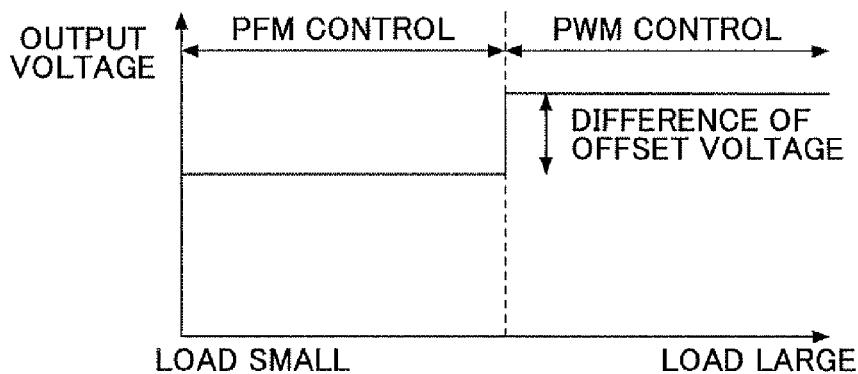
FIGS. 3A and 3B are diagrams for explaining variation of output voltages between control modes.
Figure 3B:
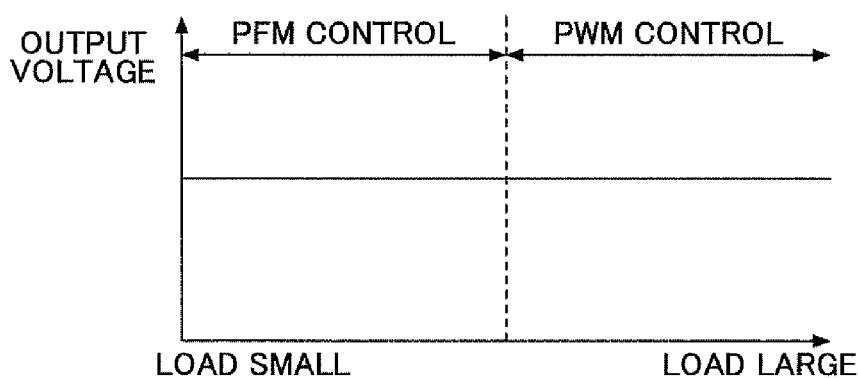

FIGS. 3A and 3B are diagrams (timing charts) for explaining variation of output voltages between control modes. FIG. 3A is a diagram for explaining variation of output voltages in a conventional technique. FIG. 3B is a diagram for explaining variation of output voltages in the present embodiment.

As shown in FIG. 3A, in a conventional configuration in which both of an error amplifier and a comparator are included in a switching regulator, a difference of output voltages occurs between the PWM control mode using the error amplifier and the PFM control mode using the comparator, the difference being a difference between offset voltages of the error amplifier and the comparator. In the present embodiment, since one amplifier is used as the error amplifier and the comparator. Thus, as shown in FIG. 3B, there is no variation of output voltages between the control modes.

Thus, according to the present embodiment, variation of output voltage can be suppressed while using a simple configuration.

Although a control mode in which the amplifier 180 is used as a comparator is the PFM control mode, the control mode in which the amplifier 180 is used as the comparator can be also applied to hysteresis control and ripple control and the like.

The present invention is not limited to the specifically disclosed embodiments, and variations and modifications may be made without departing from the scope of the present invention.

What is claimed is:

1. A switching regulator that converts an input voltage into a constant voltage and outputs the constant voltage to a load, comprising:
   switching transistors configured to perform switching according to a control signal;
   an inductor connected to the switching transistors;
   a control mode switch unit configured to switch between a first control mode and a second control mode based on a direction in which a current flows through the inductor;
   an amplifier configured to operate as an error amplifier or a comparator; and
   a phase compensation unit connected to the amplifier by a switch unit,
   wherein, in the first control mode, the control mode switch unit connects the amplifier and the phase compensation unit by turning on the switch unit so as to cause the amplifier to operate as the error amplifier, and
   in the second control mode, the control mode switch unit turns off the switch unit so as to cause the amplifier to operate as the comparator.

2. The switching regulator as claimed in claim 1, wherein the first control mode is a PWM control mode and the second control mode is a PFM control mode.

* * * * *